United States Patent

Adahan

[15] 3,704,727
[45] Dec. 5, 1972

[54] FLUID CONTROL VALVE

[72] Inventor: Carmeli Adahan, 1626 Bonita Ave., Apt. No. 6, Berkeley, Calif. 94709

[22] Filed: June 1, 1971

[21] Appl. No.: 148,588

[52] U.S. Cl. .......................................... 137/625.65
[51] Int. Cl. ............................................. F16k 11/00
[58] Field of Search ....... 137/625.65, 625.66, 625.25, 137/625.67

[56] References Cited

UNITED STATES PATENTS

| | | | |
|---|---|---|---|
| 2,634,751 | 4/1953 | Borer | 137/625.66 |
| 3,527,257 | 9/1970 | Kling | 137/625.65 |

*Primary Examiner*—M. Cary Nelson
*Assistant Examiner*—Robert J. Miller
*Attorney*—Warren P. Kujawa

[57] ABSTRACT

A fluid control valve for relieving line pressure. A shuttle valve having a longitudinal bore is reciprocably mounted in a housing. The housing is provided with a line pressure inlet having a metering orifice, a central chamber, a line pressure outlet and an exhaust outlet having a valve seat. The shuttle valve is normally biased to seal the exhaust outlet from the central chamber. An externally mounted solenoid coil provides a means for unseating the shuttle valve and venting the control chamber via the exhaust outlet.

8 Claims, 1 Drawing Figure

PATENTED DEC 5 1972
3,704,727
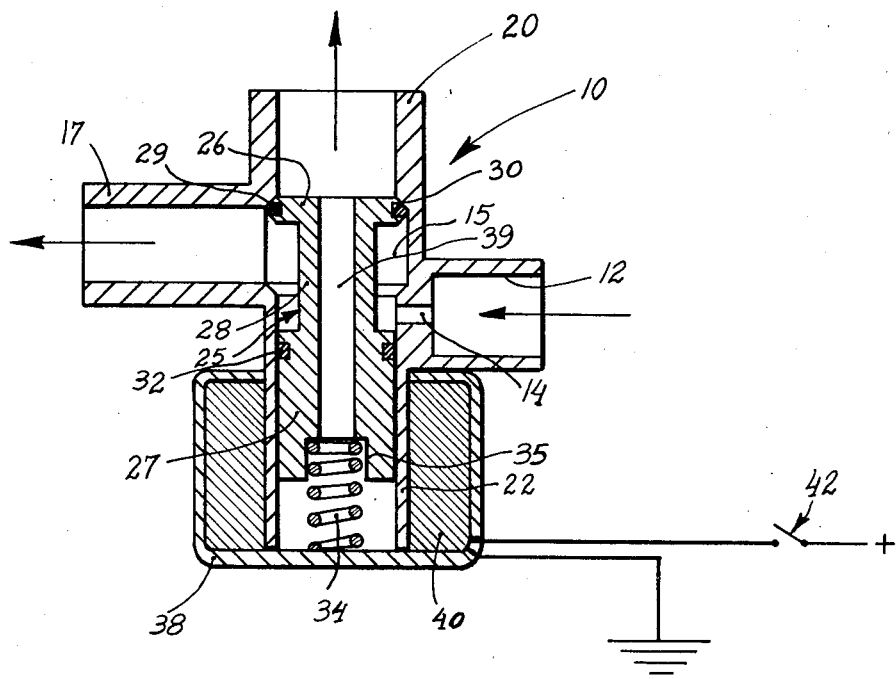
INVENTOR.
Carmeli Adahan
BY
Warren P. Kujawa

FLUID CONTROL VALVE

BACKGROUND OF THE INVENTION

1. Field of the Invention

This invention relates to fluid control valves and more particularly to valves of the type used to reduce line pressure in a fluid pressure system.

2. Brief Description of the Prior Art

Several types of valves are known which are used for controlling the line pressure in fluid pressure systems. Many devices employ complicated arrangements consisting of several moving fluid control members which are difficult to assemble and to adjust. Others employ internally mounted control elements which are susceptible to failure and which are difficult to repair or replace.

SUMMARY OF THE INVENTION

The invention disclosed herein comprises a fluid control valve which is extremely simple to assemble, provides rapid control of line pressure without excessive loading of the pressure source, and has a control element which can be replaced in the event of failure without disassembling the device.

A magnetizable shuttle valve having a pressure equalizing longitudinal bore is reciprocably mounted in a housing. The housing is provided with a line pressure inlet having a metering orifice, a central chamber, a line pressure outlet and an exhaust outlet having a valve seat at a juncture with the central chamber. The shuttle valve is normally biased by a slightly compressed spring to seal the exhaust outlet from the central chamber. A solenoid coil is mounted externally of the housing and surrounding a portion of the shuttle valve. When the solenoid coil is energized, the shuttle valve is unseated from the exhaust outlet valve seat and the central chamber is vented to the ambient pressure via the exhaust outlet. When so vented, the metering orifice prevents excessive loading of the pressure source.

DESCRIPTION OF THE DRAWING

The FIGURE illustrates a preferred embodiment of the invention suitable for use as a line pressure control valve in a pneumatic braking system.

DESCRIPTION OF THE PREFERRED EMBODIMENT

The FIGURE illustrates a preferred embodiment of the invention particularly adapted for use with a pneumatic braking system. Many types of such systems are well known and employed in a wide variety of uses, e.g. as the braking system on large automotive trucks, for which use the preferred embodiment illustrated is particularly well suited.

A housing 10 constructed of a suitable material, e.g. metal or Delrin, is provided with a generally cylindrical line pressure inlet portion 12 adapted to be connected to a suitable air pressure reservoir. An air metering orifice 14 provides fluid communication between inlet portion 12 and a central chamber 15, one end of which is in unrestricted communication with a generally cylindrical line pressure outlet portion 17. Outlet portion 17 may be connected to any suitable fluid utilization device, such as the above-mentioned pneumatic braking system. Both inlet portion 12 and outlet portion 17 may be connected to the air pressure source and the utilization device, respectively, by any means known to those skilled in the art, e.g. air tight hose couplings.

Housing 10 is also provided with a generally cylindrical exhaust outlet portion 20 in communication with atmospheric pressure.

Reciprocably mounted in a downwardly extending cylindrical portion 22 of housing 10 is a shuttle valve 25 constructed of a magnetizable material and having an upper flanged portion 26, a lower cylindrical portion 27, and a mid portion 28 of narrower diameter than portions 26 and 27. Upper flanged portion 26 is provided with a suitable seal 29, e.g. a rubber or neoprene O-ring, for providing an airtight seal with a tapered seat surface 30 at the juncture of exhaust outlet portion 20 and central chamber 15 when shuttle valve 25 is in the uppermost position. Lower cylindrical portion 27 of shuttle valve 25 is likewise provided with an O-ring or equivalent seal 32 forming an airtight seal with the inner wall of cylindrical portion 22 of housing 10.

A bias spring 34 fitted between the end surface of a recess bore 35 in the lower end of shuttle valve 25 and the inner surface of a bottom plate 38, described below, normally maintains shuttle valve 25 in the uppermost position illustrated so that central chamber 15 is sealed from exhaust outlet portion 20 and thus from the ambient pressure.

Alternatively, the lower end of bias spring 34 may be held in place by a slightly oversize insert press fitted into the opening in portion 22.

A central longitudinal bore 39 provides relatively unrestricted fluid communication between both ends of shuttle valve 25 so that the upper and lower faces thereof are maintained at atmospheric or ambient pressure.

A solenoid coil 40 surrounds downwardly extending cylindrical portion 22 and is held in place by a cover 38. A switch 42 is connected to a suitable power source and one end of solenoid coil 40, the other end of which is grounded.

In operation, with air pressure present at inlet portion 12, air is metered into central chamber 15 and thence to the active components of the pneumatic braking system at a predetermined rate controlled by the size and shape of metering orifice 14. As will be evident to those skilled in the art, the actual optimum dimensions of this orifice will vary with the particular desired application and may be empirically determined. With shuttle valve 25 in the normal position shown in the FIGURE, central chamber 15 is sealed from the ambient pressure by O-ring 29. Thus, air flows under pressure via outlet portion 17 to the utilization device. When switch 42 is closed, coil 40 is energized and the resulting magnetic field produces a force of attraction sufficient to overcome the upward bias provided by spring 34 and to pull shuttle valve 25 in a downward direction. Substantially instantaneously, the seal between O-ring 29 and exhaust outlet valve seat 20 is broken, thereby venting central chamber 15 and outlet portion 17 to ambient pressure. Consequently, the line pressure on the outlet side of the valve drops, thereby de-energizing the utilization device. When solenoid coil 40 is de-energized by opening switch 42, bias spring 34 quickly returns shuttle valve 25 to the sealing position illustrated.

The deceptively simple construction of the preferred embodiment possesses several important advantages. Due to the substantially equal surface areas exposed to ambient pressure at the upper and lower end surfaces of shuttle valve 25, and the substantially equal surface areas exposed to line pressure at the upper and lower inner surfaces of shuttle valve 25, the net force on shuttle valve 25 in either vertical direction due to the ambient and line pressures is substantially zero. Consequently, bias spring 34 need only be compressed by an amount sufficient to balance the weight of shuttle valve 25 and to provide a proper seal at the junction of O-ring 29 and seat surface 30. With a shuttle valve constructed of a lightweight material, this required spring bias force has been found to be extremely small. As a result, when solenoid coil 40 is energized, shuttle valve 25 responds very quickly with no appreciable time lag. This in turn results in a substantially instantaneous drop in line pressure. Thus, the preferred embodiment provides a means for precisely controlling a pressure operated device.

In addition, when the device is actuated to drop the outlet pressure, metering orifice 14 prevents a simultaneous pressure drop at the inlet side. This eliminates excessive demands on the pressure supply when one device is repeatedly actuated, or when several devices are actuated simultaneously.

Further, because solenoid coil 40 is fitted externally of valve 25 and housing 10, in the event of failure a new coil 40 may be easily and quickly fitted without disassembling any internal components.

The invention may be employed in a wide variety of uses. One such use is that of providing a modulation of brake line pressure in a pneumatic braking system for wheeled vehicles in order to prevent vehicle skidding. When so employed, solenoid coil 42 is connected to the output of a skid control module, which produces an output signal whenever a braked wheel is beginning to lock up. One such skid control module is disclosed in my copending application entitled "Acceleration Control Module," Attorney Docket No. 101, filed Oct. 26, 1970. Other uses of the invention will occur to those skilled in the art.

While a particular embodiment of the invention has been shown and described, various modifications thereof will be apparent to those skilled in the art. It is therefore not intended that the invention be limited to the disclosed embodiment or details thereof, but only by the appended claims.

What is claimed is:

1. A fluid control valve comprising:
    a housing having a central chamber, a fluid inlet adapted to be coupled to a fluid pressure source, a metering orifice connecting said central chamber and said fluid inlet, a first fluid outlet normally communicating with said fluid inlet via said central chamber for supplying fluid under pressure from said source to a utilization device, and a second fluid outlet open to an ambient pressure for venting said central chamber, said second fluid outlet having a valve seat;
    a shuttle valve reciprocably mounted in said housing and having a sealing surface for mating with said valve seat, said shuttle valve having a longitudinal bore for maintaining both ends thereof at said ambient pressure;
    means for biasing said valve in a position wherein said sealing surface is mated with said valve seat; and
    externally mounted means for unseating said valve in response to a control signal.

2. The apparatus of claim 1 wherein said shuttle valve comprises a generally cylindrical member having an intermediate portion with a reduced diameter.

3. The apparatus of claim 2 wherein said shuttle valve sealing surface comprises an O-ring mounted circumferentially of a first end thereof.

4. The apparatus of claim 1 wherein said biasing means comprises a tensioned spring.

5. The apparatus of claim 1 wherein said unseating means comprises a solenoid coil positioned about a portion of said shuttle valve.

6. The apparatus of claim 1 wherein said fluid pressure source comprises a source of compressed air.

7. The apparatus of claim 1 wherein said utilization device comprises a pneumatic braking system.

8. The apparatus of claim 1 wherein said unseating means comprises a solenoid coil adapted to be coupled to a skid control signal generator.

* * * * *